US012646958B2

(12) United States Patent　　　(10) Patent No.:　US 12,646,958 B2

Rouse　　　　　　　　　　　　　　(45) Date of Patent:　　Jun. 2, 2026

---

(54) BATTERY CHARGING TOOLBOX ASSEMBLY

(71) Applicant: Keith Rouse, Lafayette, IN (US)

(72) Inventor: Keith Rouse, Lafayette, IN (US)

( * ) Notice: Subject to any disclaimer, the term of this patent is extended or adjusted under 35 U.S.C. 154(b) by 0 days.

(21) Appl. No.: 18/619,915

(22) Filed: Mar. 28, 2024

(65) Prior Publication Data

US 2025/0309665 A1　　Oct. 2, 2025

(51) Int. Cl.
| | |
|---|---|
| *B25H 3/02* | (2006.01) |
| *H02J 7/50* | (2026.01) |
| *H02J 7/61* | (2026.01) |
| *H02J 7/70* | (2026.01) |

(52) U.S. Cl.
CPC .............. *H02J 7/731* (2026.01); *B25H 3/022* (2013.01); *H02J 7/50* (2026.01); *H02J 7/61* (2026.01)

(58) Field of Classification Search
CPC ............................ H02J 7/0044; H02J 7/00302
See application file for complete search history.

(56) References Cited

U.S. PATENT DOCUMENTS

| | | | | | |
|---|---|---|---|---|---|
| 2,786,500 | A | * | 3/1957 | Unterfranz | B25H 1/04 |
| | | | | | 144/285 |
| 4,641,076 | A | * | 2/1987 | Linden | A61L 2/00 |
| | | | | | 320/113 |
| 5,913,380 | A | * | 6/1999 | Gugel | E06C 7/14 |
| | | | | | 248/210 |

| | | | | | |
|---|---|---|---|---|---|
| 7,290,655 | B1 | * | 11/2007 | Wood | B23D 51/02 |
| | | | | | 206/349 |
| 8,415,924 | B2 | * | 4/2013 | Matthias | B25H 3/006 |
| | | | | | 320/114 |
| 9,221,169 | B2 | * | 12/2015 | Seidel | B25H 3/02 |
| 9,381,639 | B2 | * | 7/2016 | Werner | B25H 3/02 |
| 9,566,704 | B1 | * | 2/2017 | Stoikos | A45C 15/00 |
| D927,852 | S | | 8/2021 | Mauter | |
| 2006/0006838 | A1 | * | 1/2006 | Clarke | B25H 3/02 |
| | | | | | 320/114 |
| 2008/0035507 | A1 | * | 2/2008 | Collister | B25H 3/006 |
| | | | | | 206/349 |
| 2016/0322844 | A1 | * | 11/2016 | Pickens | A45F 5/021 |
| 2017/0063114 | A1 | * | 3/2017 | Briere | H02J 7/731 |
| 2019/0232484 | A1 | * | 8/2019 | Ender | B25H 3/006 |

(Continued)

FOREIGN PATENT DOCUMENTS

WO　　WO2021195558　　　9/2021

*Primary Examiner* — Ernesto A Grano
*Assistant Examiner* — Symren K Sanghera

(57)　　　　　　ABSTRACT

A battery charging toolbox assembly for recharging power tool batteries and storing power tools includes a container with a base wall and a peripheral wall defining a storage compartment for a plurality of power tools and a plurality of power tool batteries. A plurality of brackets may be coupled to the container. Each bracket is designed to receive an associated power tool to secure a position of the associated power tool within the storage compartment. A plurality of charging ports is coupled to the container to recharge the plurality of power tool batteries. A power input is electrically coupled to each charging port of the plurality of charging ports and is designed to transfer power from an extrinsic power source to the plurality of charging ports. A switch is electrically coupled to the power input to selectively inhibit the power input from transferring power to the plurality of charging ports.

16 Claims, 6 Drawing Sheets

(56)                    References Cited

U.S. PATENT DOCUMENTS

| | | |
|---|---|---|
| 2020/0106280 A1 | 4/2020 | Inskeep |
| 2021/0104909 A1 | 4/2021 | Mantych |
| 2021/0305824 A1* | 9/2021 | Shirazi ................... H02J 7/731 |
| 2022/0065520 A1* | 3/2022 | Lazar ................... F25D 23/063 |
| 2022/0094185 A1* | 3/2022 | Ran ......................... B25H 3/02 |
| 2023/0036215 A1 | 2/2023 | Williams |
| 2023/0361585 A1* | 11/2023 | Irwin ...................... B25H 3/04 |
| 2024/0416499 A1* | 12/2024 | Eberle ..................... H05B 3/26 |

* cited by examiner

BATTERY CHARGING TOOLBOX ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to toolboxes and more particularly pertains to a new toolbox for recharging power tool batteries and storing power tools.

(2) Description of Related Art Including Information Disclosed Under 37 CFR 1.97 and 1.98

The prior art relates to toolboxes. Toolboxes are commonly used to store and organize tools. Many tools are power tools, with rechargeable batteries as the power source. Although the prior art discloses charging ports for the rechargeable batteries, those charging ports are not incorporated into the toolboxes. Users are thus required to store their power tools separately from the batteries that are necessary for using the power tools. This can cause disorganization and confusion for the user. Because the power tools and batteries are stored separately, the user may forget to plug the batteries into the charging ports when the power tools are in storage. This can result in the batteries having a low charge, or being uncharged, when the user needs to use the power tools, delaying the user's progress on a project. Thus, there is a need for a storage center for power tools that can be used to store the power tools and the rechargeable batteries, and that includes charging ports for the rechargeable batteries.

BRIEF SUMMARY OF THE INVENTION

An embodiment of the disclosure meets the needs presented above by generally comprising a container with a base wall and a peripheral wall that is coupled to and extends outwardly from the base wall to define a storage compartment that is configured to store a plurality of power tools and a plurality of power tool batteries. The peripheral wall has a distal edge relative to the base wall. The distal edge is open to facilitate access into the storage compartment. A plurality of charging ports is coupled to the container. Each charging port of the plurality of charging ports is configured to be electrically couplable to an associated power tool battery of the plurality of power tool batteries wherein each charging port of the plurality of charging ports is configured to recharge the associated power tool battery. The plurality of charging ports is positioned on the peripheral wall. A power input is coupled to the container. The power input is electrically coupled to each charging port of the plurality of charging ports. The power input is configured to be electrically couplable to an extrinsic power source wherein the power input is configured to transfer power from the extrinsic power source to the plurality of charging ports. A switch is coupled to the container. The switch is electrically coupled to the power input. The switch is actuatable to selectively inhibit the power input from transferring power to the plurality of charging ports wherein the switch is configured to inhibit the plurality of power tool batteries from being overcharged.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
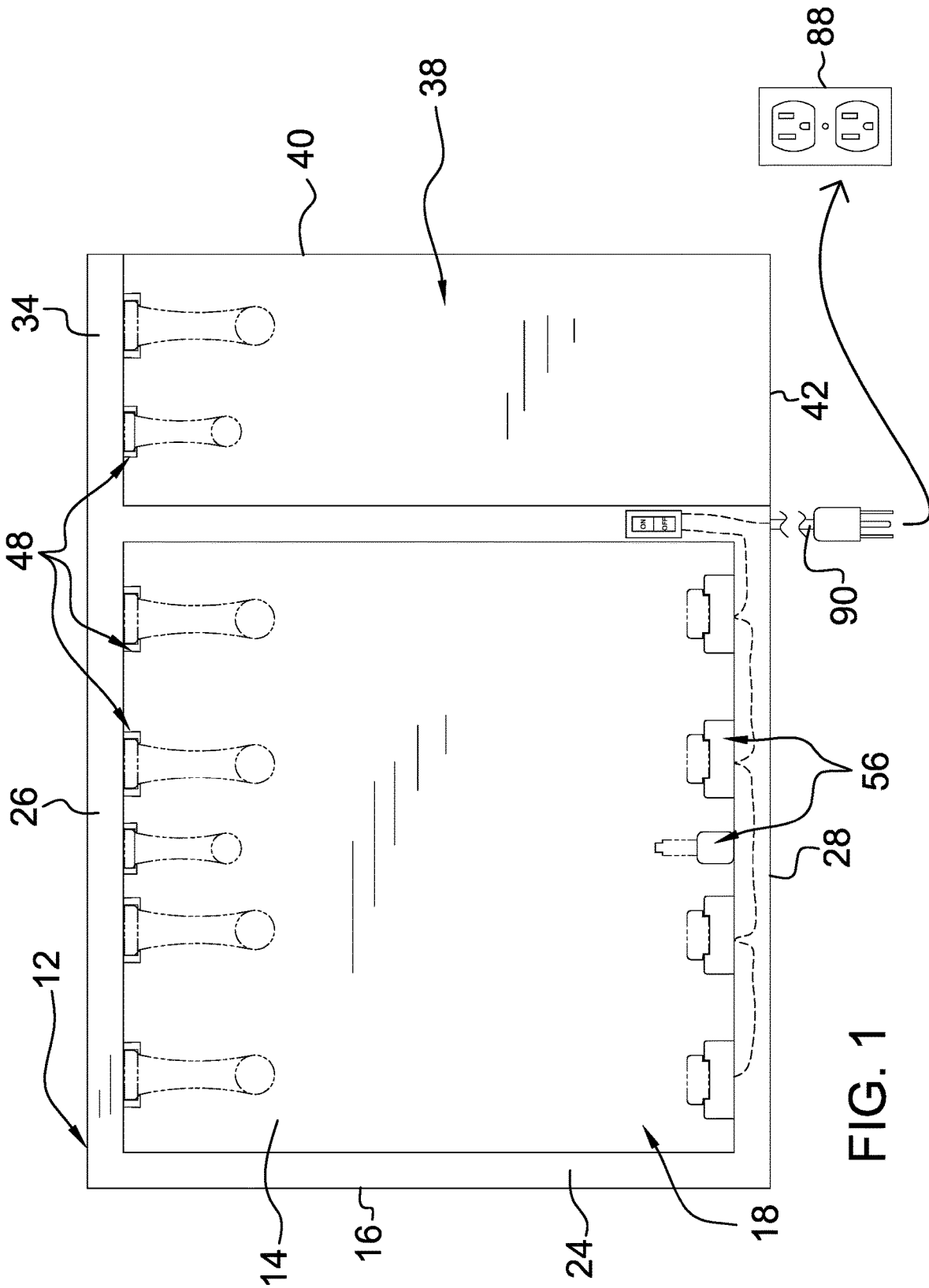
FIG. 1 is a front view of a battery charging toolbox assembly according to an embodiment of the disclosure.
Figure 3:
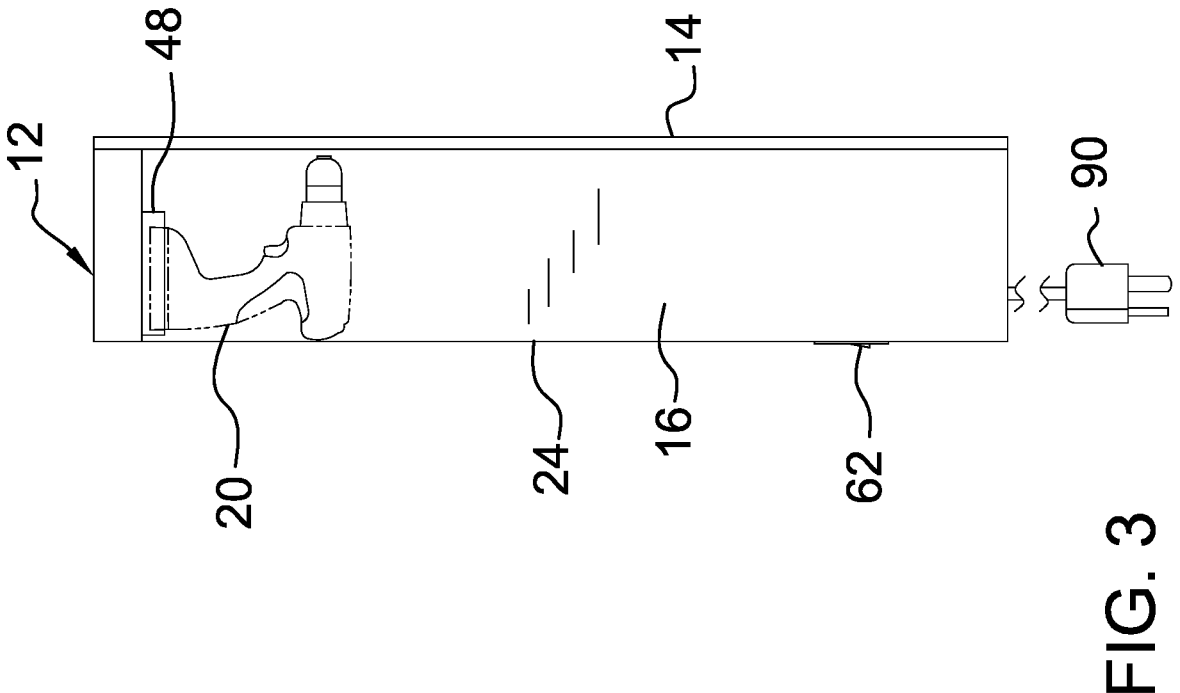
FIG. 3 is a right side view of an embodiment of the disclosure.
Figure 2:
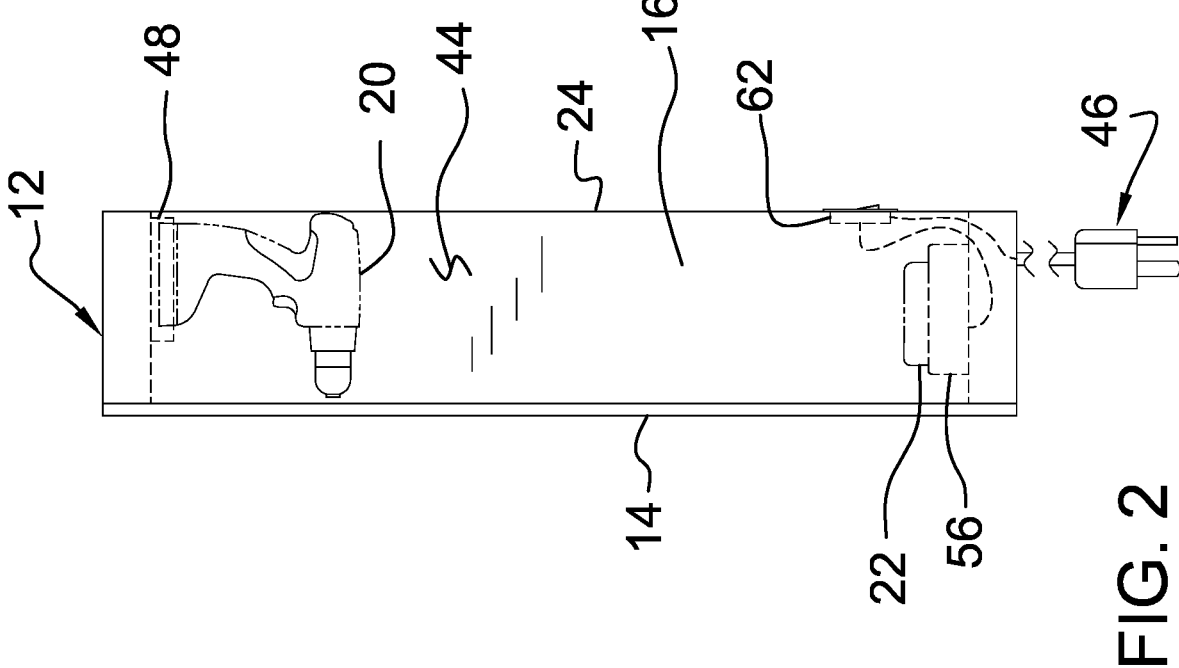
FIG. 2 is a left side view of an embodiment of the disclosure.

With reference now to the drawings, and in particular to FIGS. 1 through 7 thereof, a new toolbox embodying the principles and concepts of an embodiment of the disclosure and generally designated by the reference numeral 10 will be described.

As best illustrated in FIGS. 1 through 7, the battery charging toolbox assembly 10 generally comprises a container 12 that has a base wall 14 and a peripheral wall 16 that is coupled to and extends outwardly from the base wall 14 to define a storage compartment 18. The storage compartment 18 is configured to store a plurality of power tools 20 and a plurality of power tool batteries 22. The peripheral wall 16 has a distal edge 24 relative to the base wall 14. The distal edge 24 defines an opening 86 into the storage compartment 18. The peripheral wall 16 may have an interior surface 52 and an exterior surface 44.

The peripheral wall 16 may further comprise a top side 26 and a bottom side 28 that is spaced from the top side 26. For example, the bottom side 28 may be distally positioned on the base wall 14 relative to the top side 26. The bottom side 28 may be parallel to the top side 26. A first lateral side 30 may extend between the top side 26 and the bottom side 28. The first lateral side 30 may be perpendicular to one or both of the top side 26 and the bottom side 28. A second lateral side 32 may extend between the top side 26 and the bottom side 28. The second lateral side 32 is generally spaced from the first lateral side 30. For example, the second lateral side 32 may be distally positioned on one or both of the top side 26 and the bottom side 28 relative to the first lateral side 30. The second lateral side 32 may be parallel to the first lateral side 30. The second lateral side 32 may be perpendicular to one or both of the top side 26 and the bottom side 28.

A beam 34 may be coupled to and extend outwardly from the top side 26. For example, the beam 34 may extend past the second lateral side 32, as shown in FIG. 1. Alternatively, the beam 34 may extend outwardly past the first lateral side 30. The beam 34 may have a free end 36 that is spaced from the second lateral side 32, or the first lateral side 30. The beam 34 may be coplanar with the top side 26. The base wall 14 may extend outwardly past the second lateral side 32 and downwardly from the beam 34 to define an annex 38 that is positioned adjacent to the storage compartment 18. In such embodiments, the second lateral side 32 separates the annex 38 from the storage compartment 18.

The base wall 14 may further comprise a side edge 40 and a lower edge 42. For example, the base wall 14 may extend outwardly past the second lateral side 32 of the peripheral wall 16 wherein the side edge 40 is aligned with the free end 36 of the beam 34. The side edge 40 extends downwardly from the beam 34 to the lower edge 42. The lower edge 42 generally extends between the side edge 40 and the peripheral wall 16 of the container 12. The side edge 40 may be perpendicular to the beam 34. The lower edge 42 may be perpendicular to the side edge 40. The lower edge 42 may be aligned with the exterior surface 44 of the bottom side 28 of the peripheral wall 16.

Figure 4:
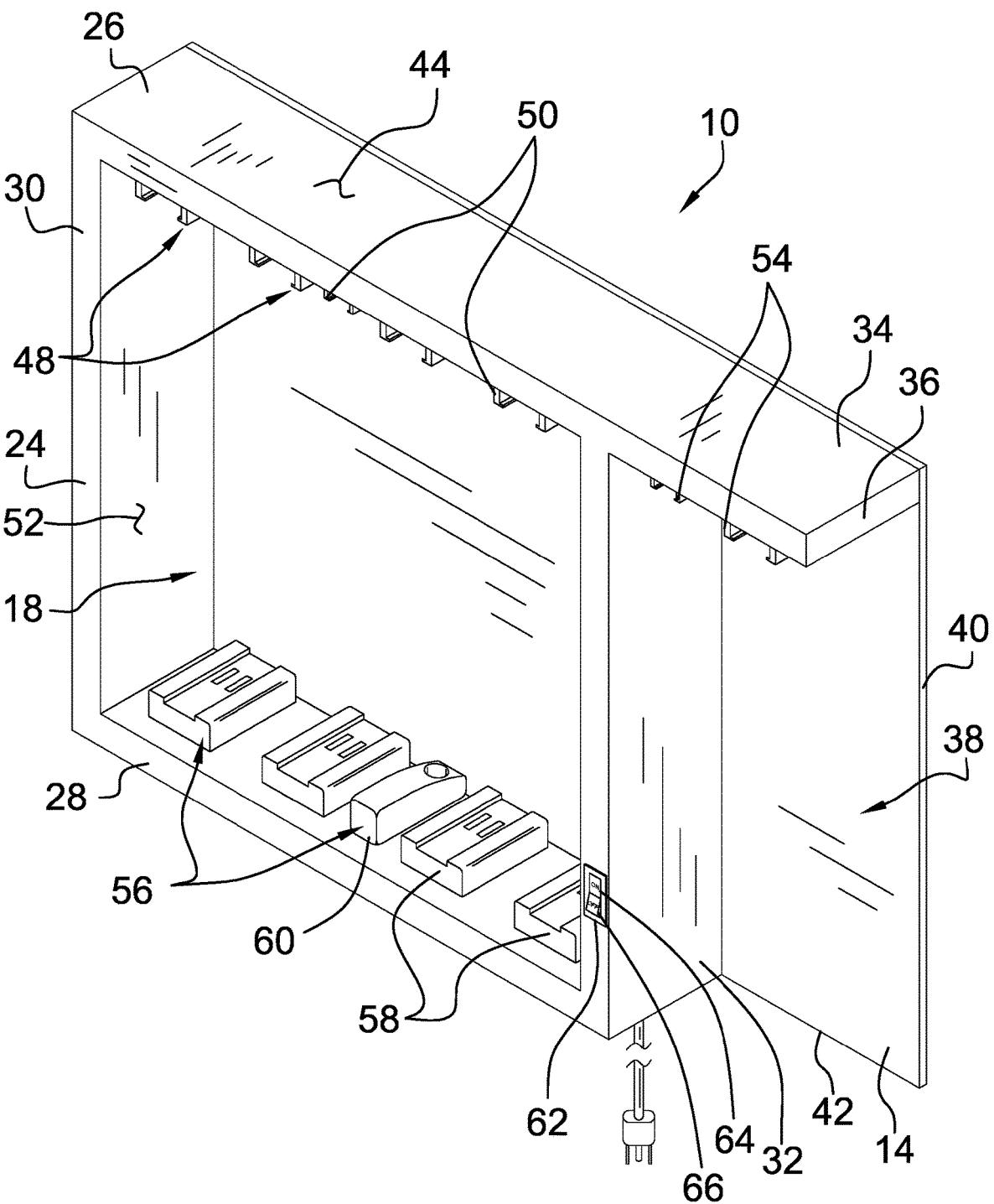
FIG. 4 is a front isometric view of an embodiment of the disclosure.

A plurality of brackets 48 may be coupled to the container 12. For example, the plurality of brackets 48 may be positioned on the top side 26 and the beam 34 of the peripheral wall 16, as shown in FIG. 4. Each bracket of the plurality of brackets 48 is configured to receive an associated power tool of the plurality of power tools 20. The associated power tool is releasably couplable to one or more bracket of the plurality of brackets 48. Each bracket of the plurality of brackets 48 is configured to secure a position of the associated power tool of the plurality of power tools 20 within one of the storage compartment 18 and the annex 38.

For example, the plurality of brackets 48 may include a compartment set of brackets 50 that is positioned within the storage compartment 18. The compartment set of brackets 50 may be aligned along the interior surface 52 of the top side 26 of the peripheral wall 16. An annex set of brackets 54 may be positioned within the annex 38. The annex set of brackets 54 may be aligned with each other along the interior surface 52 of the beam 34. The annex set of brackets 54 may be aligned with the compartment set of brackets 50.

Figure 6:
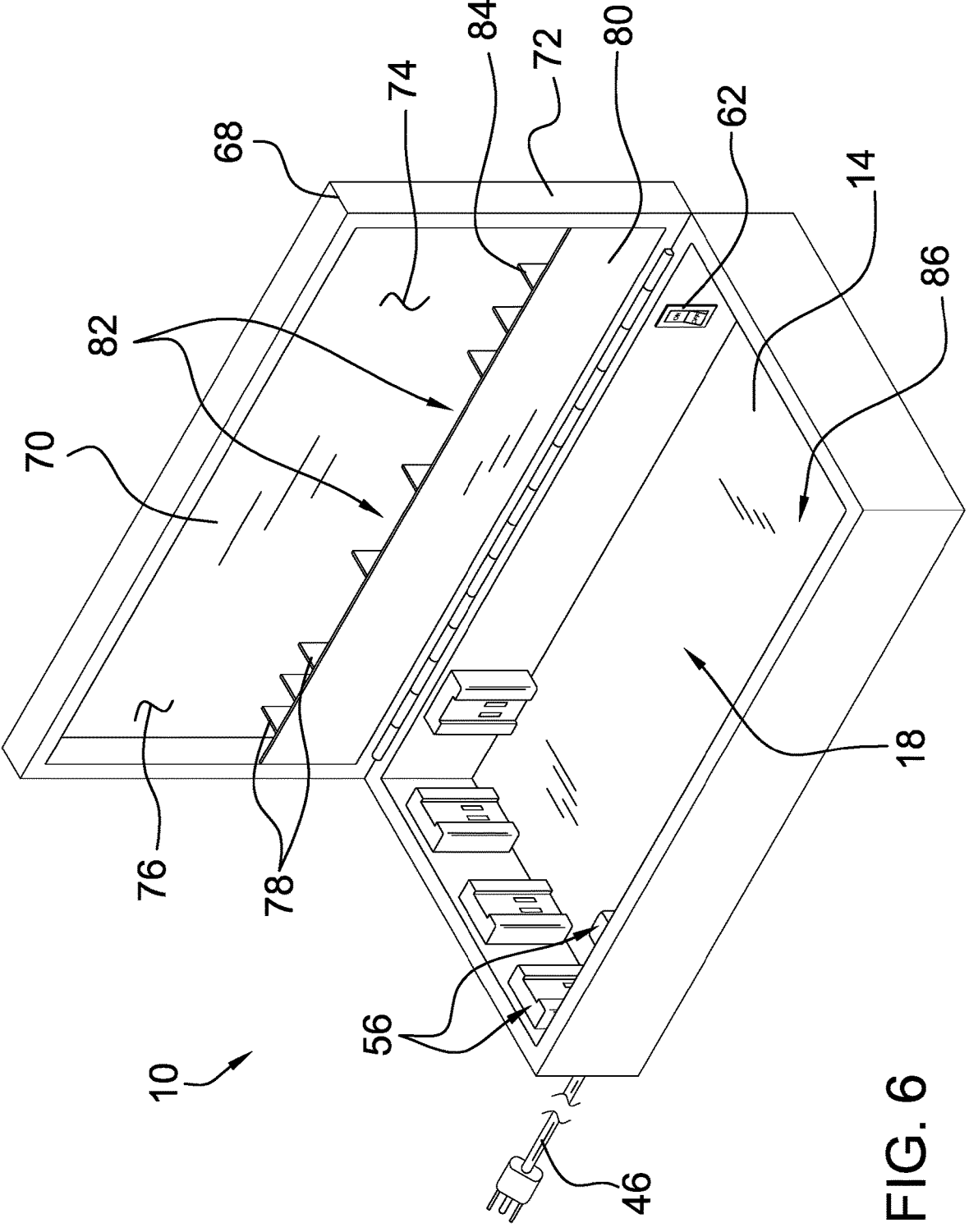
FIG. 6 is an isometric view of an embodiment of the disclosure.
Figure 7:
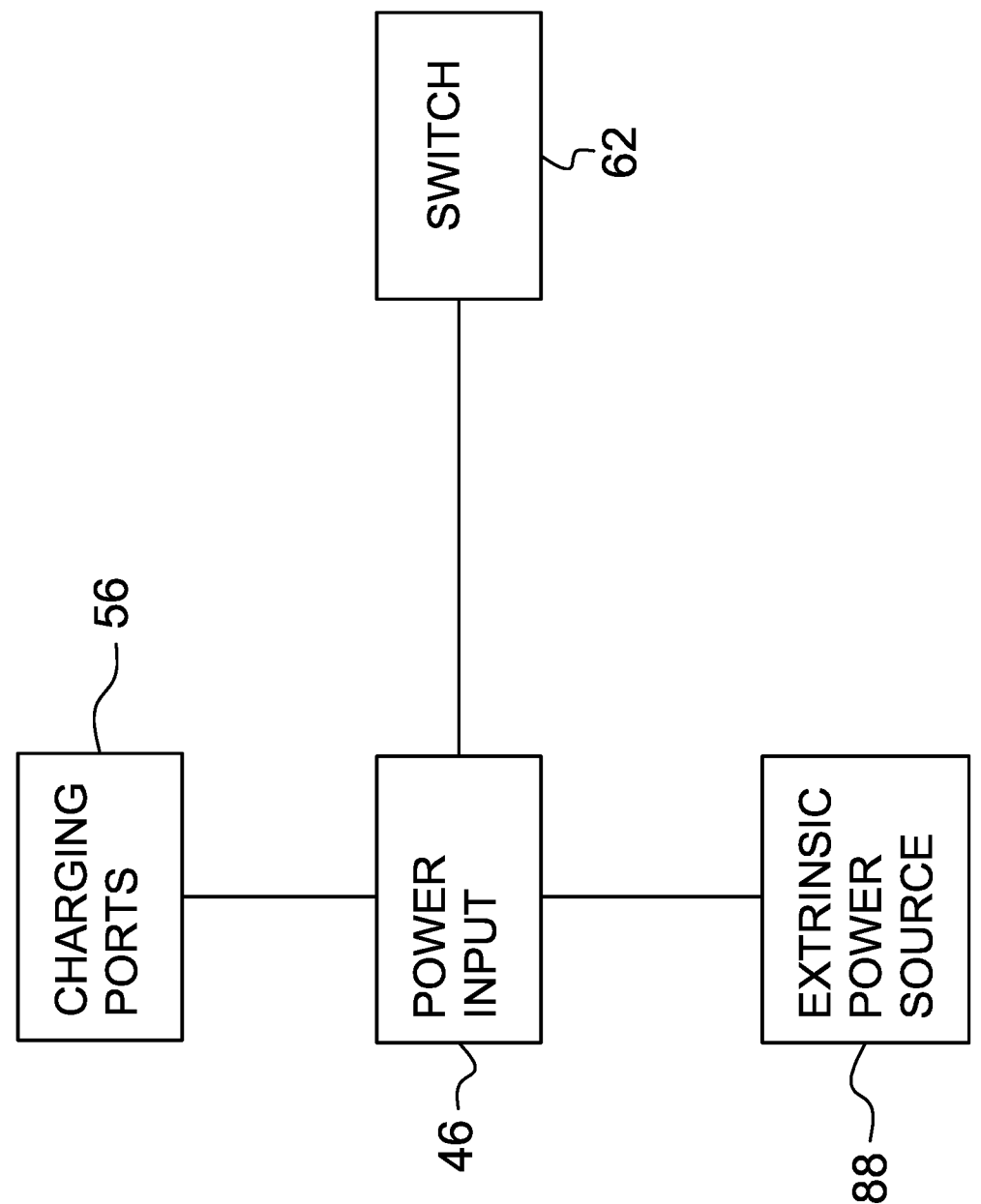
FIG. 7 is a block diagram view of an embodiment of the disclosure.

A plurality of charging ports 56 is coupled to the container 12. Each charging port of the plurality of charging ports 56 is configured to be electrically couplable to an associated power tool battery of the plurality of power tool batteries 22. Each charging port of the plurality of charging ports 56 is configured to recharge the associated power tool battery. The plurality of charging ports 56 may be positioned along the peripheral wall 16. For example, the plurality of charging ports 56 may be aligned with one another along the interior surface 52 of the bottom side 28 of the peripheral wall 16. The plurality of charging ports 56 may alternatively be positioned on one or more of the top side 26, the bottom side 28, and the first lateral side 30. In other embodiments, the plurality of charging ports 56 may also be positioned on the second lateral side 32. As shown in FIGS. 4 and 6, each charging port of the plurality of charging ports 56 may be positioned within the storage compartment 18.

The plurality of charging ports 56 may include a plurality of 12-volt charging ports 58. Each 12-volt charging port of the plurality of 12-volt charging ports 58 is configured to receive and recharge a 12-volt rechargeable battery. The plurality of charging ports 56 may further include a 9-volt charging port 60 that is configured to receive and recharge a 9-volt rechargeable battery. Other embodiments may include a plurality of 9-volt charging ports 60.

A power input 46 is coupled to the container 12. The power input 46 is electrically coupled to each charging port of the plurality of charging ports 56. The power input 46 is configured to be electrically couplable to an extrinsic power source 88. The power input 46 is configured to transfer power from the extrinsic power source 88 to the plurality of charging ports 56. For example, the extrinsic power source 88 may comprising one of a battery and an electrical socket.

The power input 46 may comprise a power cord 90 that extends outwardly from the container 12. The power cord 90 may be positioned on the bottom side 28, for example adjacent to the second lateral side 32. The power cord 90 may alternatively be positioned on the first lateral side 30, for example adjacent to the bottom side 28. In other alternative embodiments, the power input 46 may comprise a ground fault circuit interrupter or a battery.

A switch 62 is coupled to the container 12. The switch 62 is electrically coupled to the power input 46. The switch 62 is actuatable to selectively inhibit the power input 46 from transferring power to the plurality of charging ports 56 wherein the switch 62 is configured to inhibit the plurality of power tool batteries 22 from overcharging. The switch 62 may be positioned on the distal edge 24 of the peripheral wall 16. For example, the switch 62 may be positioned on the second lateral side 32 proximate to the bottom side 28, as shown in FIG. 1. In other embodiments, the switch 62 may be positioned on the interior surface 52 of the peripheral wall 16 wherein the switch 62 is positioned within the storage compartment 18. For example, the switch 62 may be positioned on the top side 26 proximate to the second lateral side 32, as shown in FIG. 6. The switch 62 generally has an on position 64 and an off position 66. The power input 46 is inhibited from transferring power to the plurality of charging ports 56 when the switch 62 is in the off position 66.

A lid 68 may be coupled to the container 12. The lid 68 may be pivotably coupled to the container 12 wherein the lid 68 is selectively positionable over the distal edge 24 of the peripheral wall 16 to cover the opening 86 and inhibit access to the storage compartment 18. The lid 68 may have a top plate 70 and a lip 72 that is coupled to and extends downwardly from the top plate 70. The top plate 70 may have an inner surface 74 and an outer surface 76.

The lid 68 may further include a plurality of side panels 78 that are coupled to and extend outwardly from the inner surface 74 of the top plate 70. An outer panel 80 may be coupled to the lip 72. The outer panel 80 may extend between each of the plurality of side panels 78 to define a plurality of bays 82 along the inner surface 74 of the top plate 70. Each bay of the plurality of bays 82 is generally open along a top edge 84 to facilitate access into each bay of the plurality of bays 82. The plurality of bays 82 is generally configured to provide additional storage space within the container 12. For example, the plurality of power tools 20 may be positionable within the plurality of bays 82.

Figure 5:
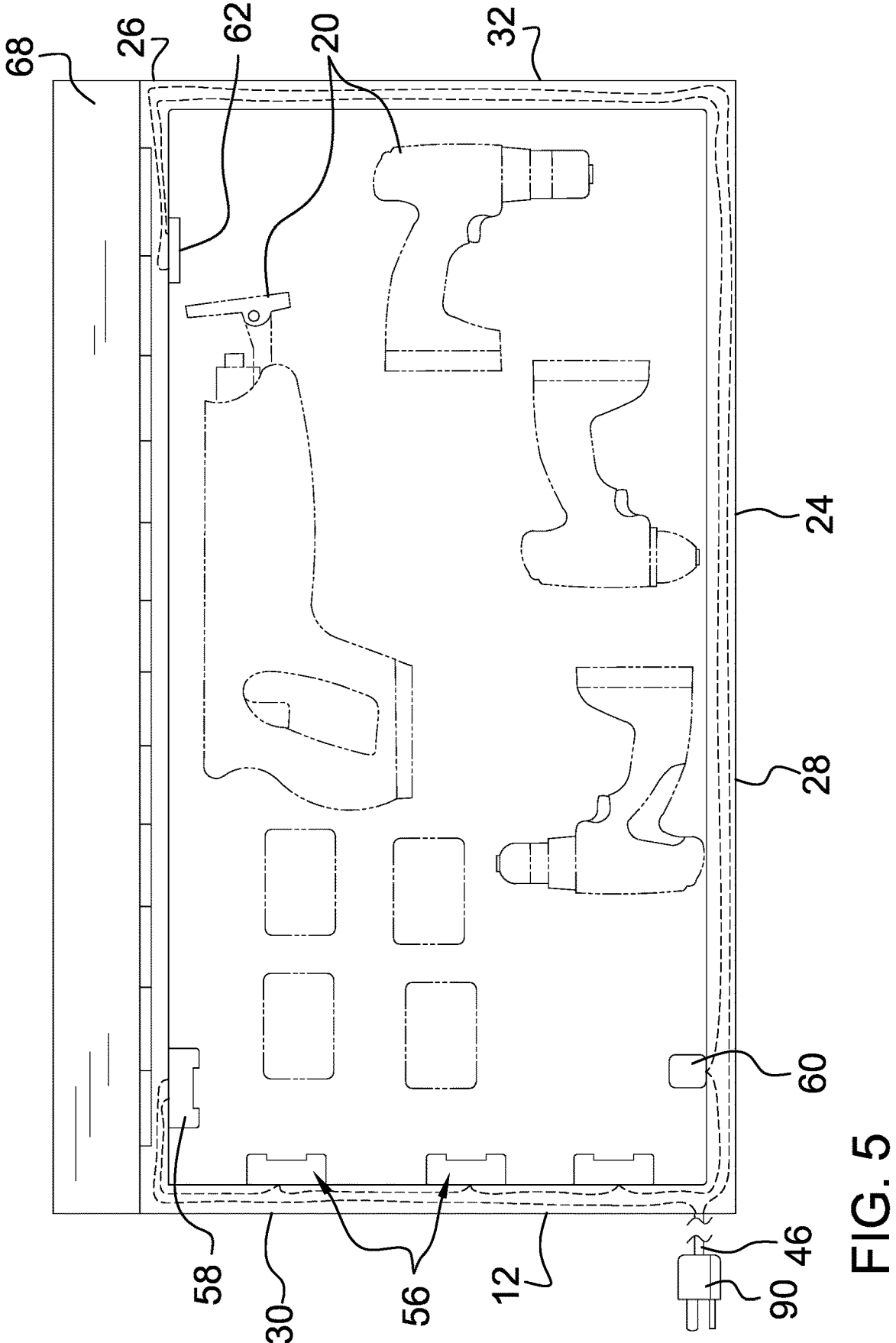
FIG. 5 is a top view of an embodiment of the disclosure.

In use, the plurality of power tools 20 can be coupled to the plurality of brackets 48 such that the plurality of power tools 20 hang from the top side 26 and the beam 34, as shown in FIG. 1. The storage compartment 18 and the annex 38 can each provide space for storing and organizing the plurality of power tools 20. Alternatively, the plurality of power tools 20 may be stored within the storage compartment 18 as shown in FIG. 5. The plurality of power tool batteries 22 can each be positioned within an associated one of the plurality of charging ports 56 to recharge the plurality of power tool batteries 22. When the plurality of power tool batteries 22 are fully charged, the switch 62 can be moved to the off position 66 to inhibit the power input 46 from transferring power to the plurality of charging ports 56, thereby inhibiting the plurality of power tool batteries 22 from being overcharged. The container 12 provides storage and organization for both the plurality of power tools 20 and the plurality of power tool batteries 22.

Embodiments according to FIG. 1 may be mounted on a wall or positioned on a surface in an area where the user wants to store the plurality of power tools 20 and the plurality of power tool batteries 22. Embodiments according to FIG. 6 may be placed in similar areas or may be used to transport the plurality of power tools 20 and the plurality of power tool batteries 22. Because the plurality of charging ports 56 and the switch 62 are positioned within the storage area, the plurality of charging ports 56 and the switch 62 may be protected from damage while the container 12 is transported from one area to another. For example, when the lid 68 is closed, the lid 68 may inhibit debris or fluids from contacting and damaging the plurality of charging ports 56, the switch 62, the plurality of power tools 20, and the plurality of power tool batteries 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A power tool storage system comprising:

a container having a base wall and a peripheral wall being coupled to and extending outwardly from the base wall to define a storage compartment being configured to store a plurality of power tools and a plurality of power tool batteries, the peripheral wall having a distal edge relative to the base wall, the distal edge being open to facilitate access into the storage compartment, the peripheral wall including:

a first lateral side extending between a top side and a bottom side;

a second lateral side extending between the top side and the bottom side, the second lateral side being spaced from the first lateral side; and a beam being coupled to and extending outwardly from the top side, the base wall extending downwardly from the beam to define an annex being positioned adjacent to the storage compartment, the beam including a free end being spaced from the second lateral side, the base wall further comprising a side edge and a lower edge, the base wall extending outwardly past the second lateral side of the peripheral wall wherein the side edge is aligned with the free end of the beam, the side edge extending from the beam to the lower edge;

a plurality of charging ports being coupled to a bottom side of the peripheral wall, each charging port of the plurality of charging ports being configured to be electrically couplable to an associated power tool battery of the plurality of power tool batteries wherein each charging port of the plurality of charging ports is configured to recharge the associated power tool battery;

a plurality of brackets being coupled to the top side of the peripheral wall, each bracket of the plurality of brackets being configured to receive an associated power tool of a plurality of power tools wherein the associated power tool is releasably couplable to each bracket of the plurality of brackets while the associated power tool battery is coupled to an associated charging port of the plurality of charging ports whereby the plurality of charging ports are configured to secure a position of the plurality of power tool batteries on the bottom side of the peripheral wall while the plurality of brackets are configured to suspend of the plurality of power tools from the top side of the peripheral wall;

a power input being coupled to the container, the power input being electrically coupled to each charging port of the plurality of charging ports, the power input being configured to be electrically couplable to an extrinsic power source wherein the power input is configured to transfer power from the extrinsic power source to the plurality of charging ports; and a switch being coupled to the container, the switch being electrically coupled to the power input, the switch being actuatable to selectively inhibit the power input from transferring power to the plurality of charging ports wherein the switch is configured to inhibit the plurality of power tool batteries from being overcharged.

2. The power tool storage system of claim 1, wherein the lower edge is aligned with an exterior surface of the bottom side of the peripheral wall.

3. The power tool storage system of claim 1, the plurality of brackets further comprising a compartment set of brackets being positioned within the storage compartment and an annex set of brackets being positioned within the annex.

4. The power tool storage system of claim 1, wherein the plurality of charging ports is aligned with one another along an interior surface of the bottom side of the peripheral wall wherein each of the plurality of charging ports is positioned within the storage compartment.

5. The power tool storage system of claim 4, wherein the plurality of charging ports is positioned on one or more of the top side, the bottom side, and the first lateral side of the peripheral wall.

6. The power tool storage system of claim 1, the plurality of charging ports further comprising:

a 12-volt charging port being configured to receive and recharge a 12-volt rechargeable battery; and a 9-volt charging port being configured to receive and recharge a 9-volt rechargeable battery.

7. The power tool storage system of claim 1, the power input further comprising a power cord extending outwardly from the container.

8. The power tool storage system of claim 7, wherein the power cord is positioned on the bottom side of the peripheral wall adjacent to the second lateral side of the peripheral wall.

9. The power tool storage system of claim 7, wherein the power cord is positioned on the first lateral side adjacent to the bottom side.

10. The power tool storage system of claim 1, wherein the switch is positioned on the distal edge of the peripheral wall.

11. The power tool storage system of claim 1, wherein the switch is positioned on an interior surface of the peripheral wall wherein the switch is positioned within the storage compartment.

12. The power tool storage system of claim 1, wherein the switch has an on position and an off position wherein the power input is inhibited from transferring power to the plurality of charging ports when the switch is in the off position.

13. The power tool storage system of claim 1, further comprising a lid being coupled to the container, the lid being pivotably coupled to the container wherein the lid is selectively positionable over the distal edge of the peripheral wall to inhibit access to the storage compartment.

14. The power tool storage system of claim 13, the lid further comprising a top plate and a lip being coupled to and extending downwardly from the top plate, the top plate having an inner surface and an outer surface.

15. The power tool storage system of claim 14, the lid further comprising:

a plurality of side panels being coupled to and extending outwardly from the inner surface of the top plate; and an outer panel being coupled to the lip, the outer panel extending between opposing sides of the lip wherein the outer panel extends across each of the plurality of side panels to define a plurality of bays along the inner surface of the top plate, each bay of the plurality of bays being open along a top edge to facilitate access into each bay of the plurality of bays, the plurality of bays being configured to provide additional storage space within the container.

16. A power tool storage system comprising:

a container having a base wall and a peripheral wall being coupled to and extending outwardly from the base wall to define a storage compartment being configured to store a plurality of power tools and a plurality of power tool batteries, the peripheral wall having a distal edge relative to the base wall, the distal edge defining an opening into the storage compartment, the peripheral wall having an interior surface and an exterior surface, the peripheral wall further comprising:

a top side;

a bottom side being spaced from the top side, the bottom side being parallel to the top side;

a first lateral side extending between the top side and the bottom side;

a second lateral side extending between the top side and the bottom side, the second lateral side being spaced from the first lateral side, the second lateral side being parallel to the first lateral side, the second lateral side being perpendicular to each of the top side and the bottom side;

a beam being coupled to and extending outwardly from the top side past the second lateral side, the beam having a free end being spaced from the second lateral side, the beam being coplanar with the top side, the base wall extending downwardly from the beam to define an annex being positioned adjacent to the storage compartment wherein the second lateral side separates the annex from the storage compartment;

the base wall further comprising a side edge and a lower edge, the base wall extending outwardly past the second lateral side of the peripheral wall wherein the side edge is aligned with the free end of the beam, the side edge extending downwardly from the beam, the side edge being perpendicular to the beam, the lower edge being perpendicular to the side edge, the lower edge being aligned with the exterior surface of the bottom side of the peripheral wall, the lower edge extending between the side edge and peripheral wall of the container;

a plurality of brackets being coupled to the container, the plurality of brackets being positioned on the top side and the beam of the peripheral wall, each bracket of the plurality of brackets being configured to receive an associated power tool of a plurality of power tools wherein the associated power tool is releasably couplable to each bracket of the plurality of brackets and wherein each bracket of the plurality of brackets is configured to secure a position of the associated power tool of the plurality of power tools within one of the storage compartment and the annex, the plurality of brackets including:

a compartment set of brackets being positioned within the storage compartment, the compartment set of brackets being aligned along the interior surface of the top side of the peripheral wall;

an annex set of brackets being positioned within the annex, the annex set of brackets being aligned along the interior surface of the beam wherein the annex set of brackets is aligned with the compartment set of brackets;

a plurality of charging ports being coupled to the container, each charging port of the plurality of charging ports being configured to be electrically couplable to an associated power tool battery of the plurality of power tool batteries wherein each charging port of the plurality of charging ports is configured to recharge the associated power tool battery, the plurality of charging ports being positioned along the peripheral wall, the plurality of charging ports being aligned with one another along the interior surface of the bottom side of the peripheral wall wherein each of the plurality of charging ports is positioned within the storage compartment, the plurality of charging ports including:

a plurality of 12-volt charging ports, each 12-volt charging port being configured to receive and recharge a 12-volt rechargeable battery;

a 9-volt charging port being configured to receive and recharge a 9-volt rechargeable battery;

a power input being coupled to the container, the power input being electrically coupled to each charging port of the plurality of charging ports, the power input being configured to be electrically couplable to an extrinsic power source wherein the power input is configured to transfer power from the extrinsic power source to the plurality of charging ports, the power input comprising a power cord extending outwardly from the container, the power cord being positioned on the bottom side adjacent to the second lateral side;

a switch being coupled to the container, the switch being electrically coupled to the power input, the switch being actuatable to selectively inhibit the power input from transferring power to the plurality of charging ports wherein the switch is configured to inhibit the plurality of power tool batteries from being overcharged, the switch being positioned on the distal edge of the peripheral wall, the switch being positioned on the second lateral side proximate to the bottom side, the switch having an on position and an off position wherein the power input is inhibited from transferring power to the plurality of charging ports when the switch is in the off position;

a lid being coupled to the container, the lid being pivotably coupled to the container wherein the lid is selectively positionable over the distal edge of the peripheral wall to inhibit access to the storage compartment, the lid having a top plate and a lip being coupled to and extending downwardly from the top plate, the top plate having an inner surface and an outer surface, the lid further comprising:

a plurality of side panels being coupled to and extending outwardly from the inner surface of the top plate; and an outer panel being coupled to the lip, the outer panel extending between opposing sides of the lip wherein the outer panel extends across each of the plurality of side panels to define a plurality of bays along the inner surface of the top plate, each bay of the plurality of bays being open along a top edge to facilitate access into each bay of the plurality of bays, the plurality of bays being configured to provide additional storage space within the container.

\* \* \* \* \*